US012736945B2

(12) United States Patent
Chakraborty et al.

(10) Patent No.: US 12,736,945 B2
(45) Date of Patent: Sep. 15, 2026

(54) METHOD AND SYSTEM FOR COMPUTING TOOLPATHS FOR MACHINING POCKETS

(71) Applicant: HCL Technologies Limited, New Delhi (IN)

(72) Inventors: Tathagata Chakraborty, Pune (IN); Chinmaya Panda, Navi Mumbai (IN); Nitin Umap, Pune (IN)

(73) Assignee: HCL Technologies Limited, New Delhi (IN)

( * ) Notice: Subject to any disclaimer, the term of this patent is extended or adjusted under 35 U.S.C. 154(b) by 393 days.

(21) Appl. No.: 18/434,889

(22) Filed: Feb. 7, 2024

(65) Prior Publication Data

US 2024/0272610 A1 Aug. 15, 2024

(30) Foreign Application Priority Data

Feb. 15, 2023 (IN) ............................ 202311010078

(51) Int. Cl.
*G05B 19/4093* (2006.01)
*G05B 19/4099* (2006.01)

(52) U.S. Cl.
CPC ... *G05B 19/40937* (2013.01); *G05B 19/4099* (2013.01)

(58) Field of Classification Search
CPC ...................... G05B 19/40937; G05B 19/4099
(Continued)

(56) References Cited

U.S. PATENT DOCUMENTS 9,164,503 B2 10/2015 Bolin et al.
2012/0221140 A1* 8/2012 Berman ............ G05B 19/4093 83/13

(Continued)

FOREIGN PATENT DOCUMENTS

JP 2002283118 A 3/2001
WO 2015029034 A2 3/2015

OTHER PUBLICATIONS

Chungang Zhuang, Zhenhua Xiong, Han Ding; High speed machining tool path generation for pockets using level sets; International Journal of Production Research; Oct. 29, 2009; pp. 5749-5766; vol. 48, 2010—Issue 19; China.

(Continued)

*Primary Examiner* — Jigneshkumar C Patel
(74) *Attorney, Agent, or Firm* — Kendal M. Sheets

(57) ABSTRACT

The invention relates to method and system for machining a pocket on a raw material body. The method includes rendering 2-dimensional pixel representation corresponding to cross-section of machining tool and pocket; determining start point for toolpath from 2D pixel representation; for computing each of subsequent segments in toolpath, determining tool engagement values corresponding to potential moves of machining tool with raw material body, and one of, selecting move with corresponding tool engagement value closest to required tool engagement value, or selecting next move that follows boundary of pocket; identifying cutting sections and non-cutting sections; identifying trochoidal region groups from cutting sections and boundary region groups from non-cutting sections in the raw toolpath; for each of trochoidal region groups in raw toolpath, joining end point of first curvilinear cutting section with start point of second curvilinear cutting section through link move to obtain trochoidal toolpath; computing complete toolpath from raw toolpath.

20 Claims, 8 Drawing Sheets

(58) Field of Classification Search
USPC ............................................................ 700/86
See application file for complete search history.

(56) References Cited

U.S. PATENT DOCUMENTS

| | | | | |
|---|---|---|---|---|
| 2017/0045873 | A1* | 2/2017 | Sona | B23C 3/16 |
| 2020/0081415 | A1* | 3/2020 | Ozeki | G05B 19/4099 |
| 2021/0397142 | A1 | 12/2021 | Lovell et al. | |

OTHER PUBLICATIONS

Yuwen Sun, Zhenyuan Jia, Fei Ren, Dongming Guo; Adaptive feedrate scheduling for NC machining along curvilinear paths with improved kinematic and geometric properties; Springer Link; Nov. 18, 2006; vol. 36, pp. 60-68.

Fei Ren, Yuwen Sun, Dongming Guo; Combined reparameterization-based spiral toolpath generation for five-axis sculptured surface machining; Springer Link; Jan. 29, 2008; vol. 40, pp. 760-768.

* cited by examiner

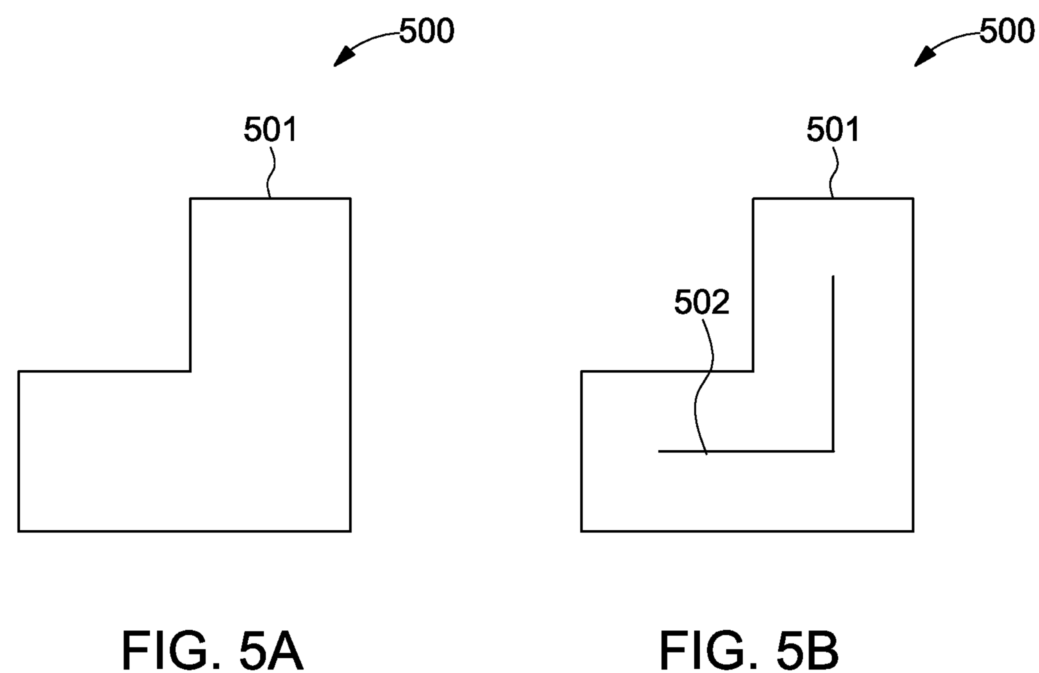
FIG. 5A
FIG. 5B
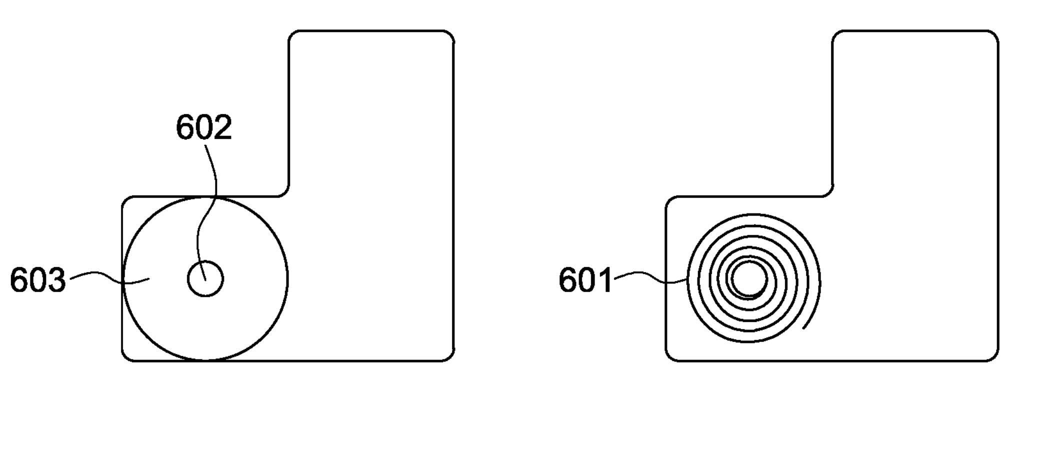
FIG. 6A
FIG. 6B

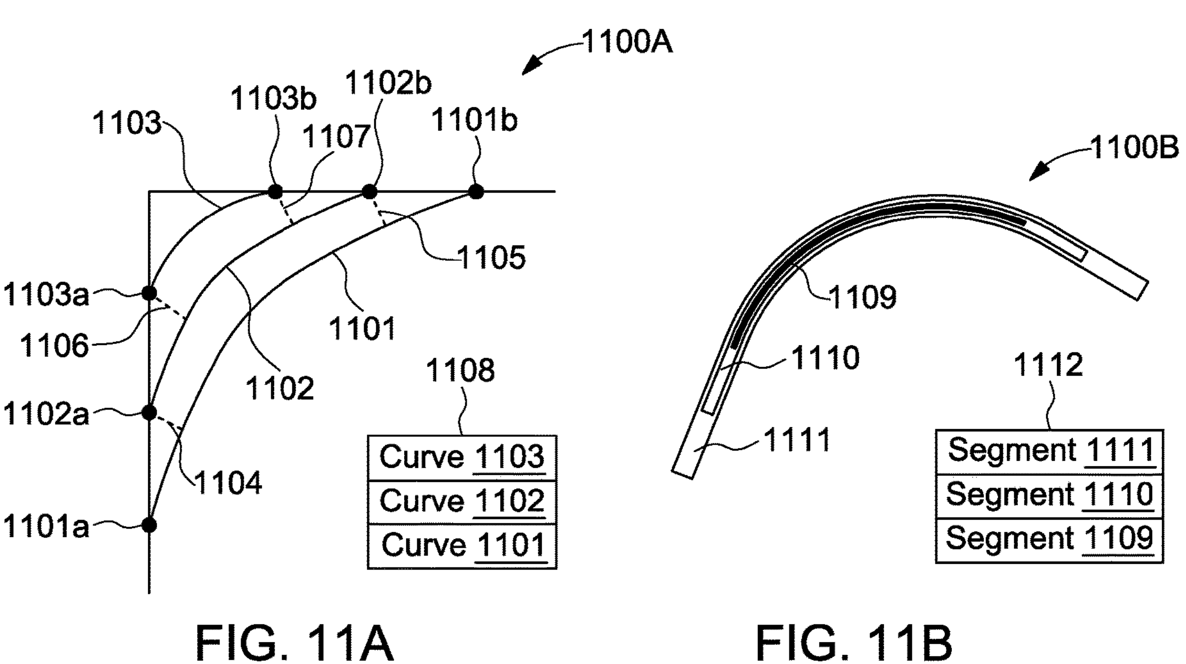
FIG. 11A
FIG. 11B
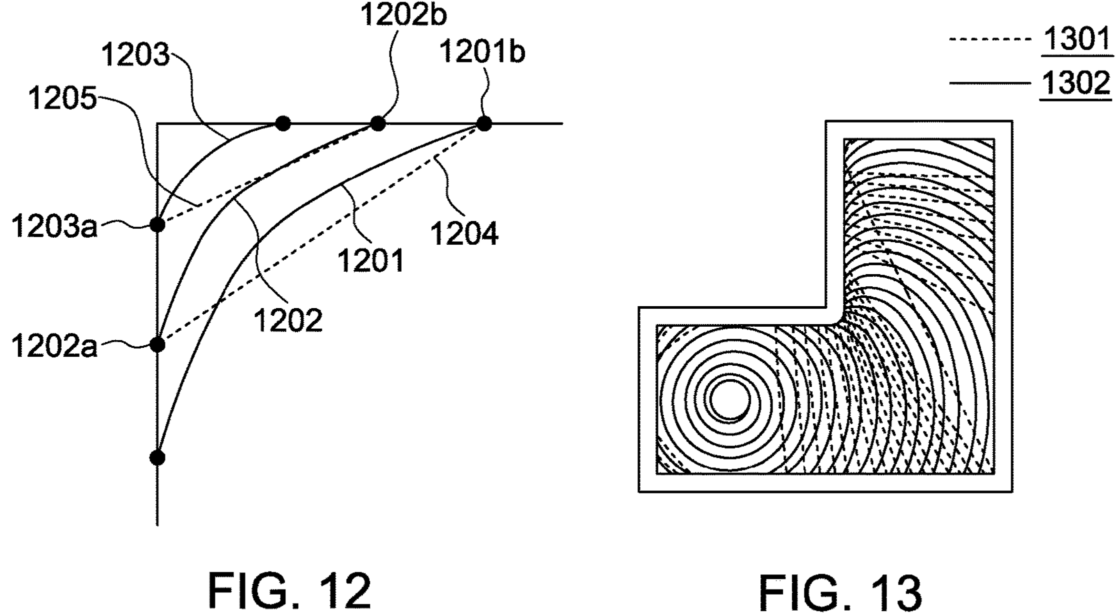
FIG. 12
FIG. 13

METHOD AND SYSTEM FOR COMPUTING TOOLPATHS FOR MACHINING POCKETS

TECHNICAL FIELD

Generally, the invention relates to machining systems. More specifically, the invention relates to a system and method for computing a toolpath for machining a pocket on a raw material body.

BACKGROUND

In spite of the popularity of 3-axis and 5-axis Computer Numerical control (CNC) machines, machining of 2.5D pockets has remained important. Large volumes of a given part can be quickly and effectively machined using 2.5D rough cutting techniques. Typically, 2.5D roughing toolpaths are categorized into three broad groups including a contour-parallel category, a direction-parallel category, and a curvilinear or spiral category. Among these categories, curvilinear toolpaths are best suited for high-speed machining.

Further, techniques like contour-parallel and direction-parallel are commonly used for pocket machining. Toolpaths computed through these techniques i.e., contour-parallel toolpaths and direction-parallel zig-zag toolpaths, include many sharp corners where curvature is high. A tool needs to be invariably slowed down when it is in proximity to a sharp corner and then the speed can be increased. The deceleration and acceleration significantly slow down machining time. Toolpaths with sharp corners also wear down the tools faster since tool engagement increases abruptly at these corners. Further, some curvilinear toolpath generation techniques also exist for machining pockets. However, these techniques lack in generating toolpaths for complex geometries. Also, the curvilinear toolpath generation techniques are not used due to software unavailability and licensing costs.

Apart from curvilinear toolpath generation techniques, there are some available spiral toolpath techniques for machining. Some of these techniques are based on offset curves computation which uses medial axis transform. However, the curves maintain a constant tool engagement by avoiding sharp corners. The remaining corner regions are then machined using trochoidal moves. Further, some techniques disclose machining island boundaries first using trochoidal moves, rest of the pockets using a spiral toolpath, and remaining corners using trochoidal moves.

Therefore, there is a need to develop techniques that are easy to implement, allow high-speed machining, and are capable of generating toolpaths for complex geometries.

SUMMARY

In one embodiment, a method for computing a toolpath for machining a pocket on a raw material body is disclosed. The method may include rendering a 2-dimensional (2D) pixel representation corresponding to a cross-section of each of a machining tool and the pocket. The method may further include determining a start point for the toolpath from the 2D pixel representation. The toolpath may include a plurality of segments. For computing each of subsequent segments in the toolpath, the method may further include determining tool engagement values corresponding to a plurality of potential moves of the machining tool with the raw material body based on the 2D pixel representation, and one of selecting, from the plurality of potential moves, a move with a corresponding tool engagement value closest to a required tool engagement value, or selecting a move as a next move that follows a boundary of the pocket when the determined tool engagement value is not positive. The method may further include identifying a set of cutting sections and a set of non-cutting sections based on the engagement value at each toolpath segment. The method may further include identifying a plurality of trochoidal region groups from the set of cutting sections and a plurality of boundary region groups from the set of non-cutting sections in the raw toolpath. The plurality of trochoidal region groups may include a plurality of approximately parallel curvilinear cutting sections, and the plurality of boundary region groups may include a plurality of overlapping non-cutting sections. The method may further include, for each of the plurality of trochoidal region groups in the raw toolpath, joining an end point of a first curvilinear cutting section with a start point of a second curvilinear cutting section through a link move to obtain a trochoidal toolpath. The method may further include computing a complete toolpath from the raw toolpath based on the trochoidal toolpath and the plurality of boundary region groups.

In another embodiment, a system for computing a toolpath for machining a pocket on a raw material body is disclosed. The system may include a processor and a memory communicatively coupled to the processor. The memory may store processor-executable instructions, which on execution, may further cause the processor to render a 2-dimensional (2D) pixel representation corresponding to a cross-section of each of a machining tool and the pocket. The processor-executable instructions, on execution, may further cause the processor to determine a start point for the toolpath from the 2D pixel representation. The toolpath may include a plurality of segments. Further, for computing each of subsequent segments in the toolpath, the processor-executable instructions, on execution, may further cause the processor to determine tool engagement values corresponding to a plurality of potential moves of the machining tool with the raw material body based on the 2D pixel representation, and one of, selecting a move with a corresponding tool engagement value closest to a required tool engagement value, or selecting a move as a next move that follows a boundary of the pocket, when the determined tool engagement value is not positive. The processor-executable instructions, on execution, may further cause the processor to identify a set of cutting sections and a set of non-cutting sections based on the engagement value at each toolpath segment. The processor-executable instructions, on execution, may further cause the processor to identify a plurality of trochoidal region groups from the set of cutting sections and a plurality of boundary region groups from the set of non-cutting sections in the raw toolpath. The plurality of trochoidal region groups may include a plurality of approximately parallel curvilinear cutting sections, and the plurality of boundary region groups may include a plurality of overlapping non-cutting sections. The processor-executable instructions, on execution, may further cause the processor to join an end point of a first curvilinear cutting section with a start point of a second curvilinear cutting section through a link move to obtain a trochoidal toolpath, for each of the plurality of trochoidal region groups in the raw toolpath. The processor-executable instructions, on execution, may further cause the processor to compute a complete toolpath from the raw toolpath based on the trochoidal toolpath and the plurality of boundary region groups.

In yet another embodiment, a non-transitory computer-readable medium storing computer-executable instructions for computing a toolpath for machining a pocket on a raw material body is disclosed. The stored instructions, when executed by a processor, may cause the processor to perform operations including rendering a 2-dimensional (2D) pixel representation corresponding to a cross-section of each of a machining tool and the pocket. The operations may further include determining a start point for the toolpath from the 2D pixel representation. The toolpath may include a plurality of segments. For computing each of subsequent segments in the toolpath, the operations may further include determining tool engagement values corresponding to a plurality of potential moves of the machining tool with the raw material body based on the 2D pixel representation, and one of selecting, from the plurality of potential moves, a move with a corresponding tool engagement value closest to a required tool engagement value, or selecting a move as a next move that follows a boundary of the pocket when the determined tool engagement value is not positive. The operations may further include identifying a set of cutting sections and a set of non-cutting sections based on the engagement value at each toolpath segment. The operations may further include identifying a plurality of trochoidal region groups from the set of cutting sections and a plurality of boundary region groups from the set of non-cutting sections in the raw toolpath. The plurality of trochoidal region groups may include a plurality of approximately parallel curvilinear cutting sections, and the plurality of boundary region groups may include a plurality of overlapping non-cutting sections. The operations may further include, for each of the plurality of trochoidal region groups in the raw toolpath, joining an end point of a first curvilinear cutting section with a start point of a second curvilinear cutting section through a link move to obtain a trochoidal toolpath. The operations may further include computing a complete toolpath from the raw toolpath based on the trochoidal toolpath and the plurality of boundary region groups.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIGS. 5A and 5B illustrate an exemplary L-shaped pocket, in accordance with some embodiments of the present disclosure.

FIGS. 6A and 6B illustrate material cut and tool engagement, and toolpath computed, through a simple spiral toolpath strategy, in accordance with some embodiments of the present disclosure.

FIGS. 11A and 11B illustrate trochoidal region grouping and boundary region grouping, in accordance with some embodiments of the present disclosure.

FIG. 12 illustrates exemplary connections of trochoidal regions, in accordance with some embodiments of the present disclosure.

FIG. 13 illustrates an exemplary computed toolpath with trochoidal moves, in accordance with some embodiments of the present disclosure.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions). Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
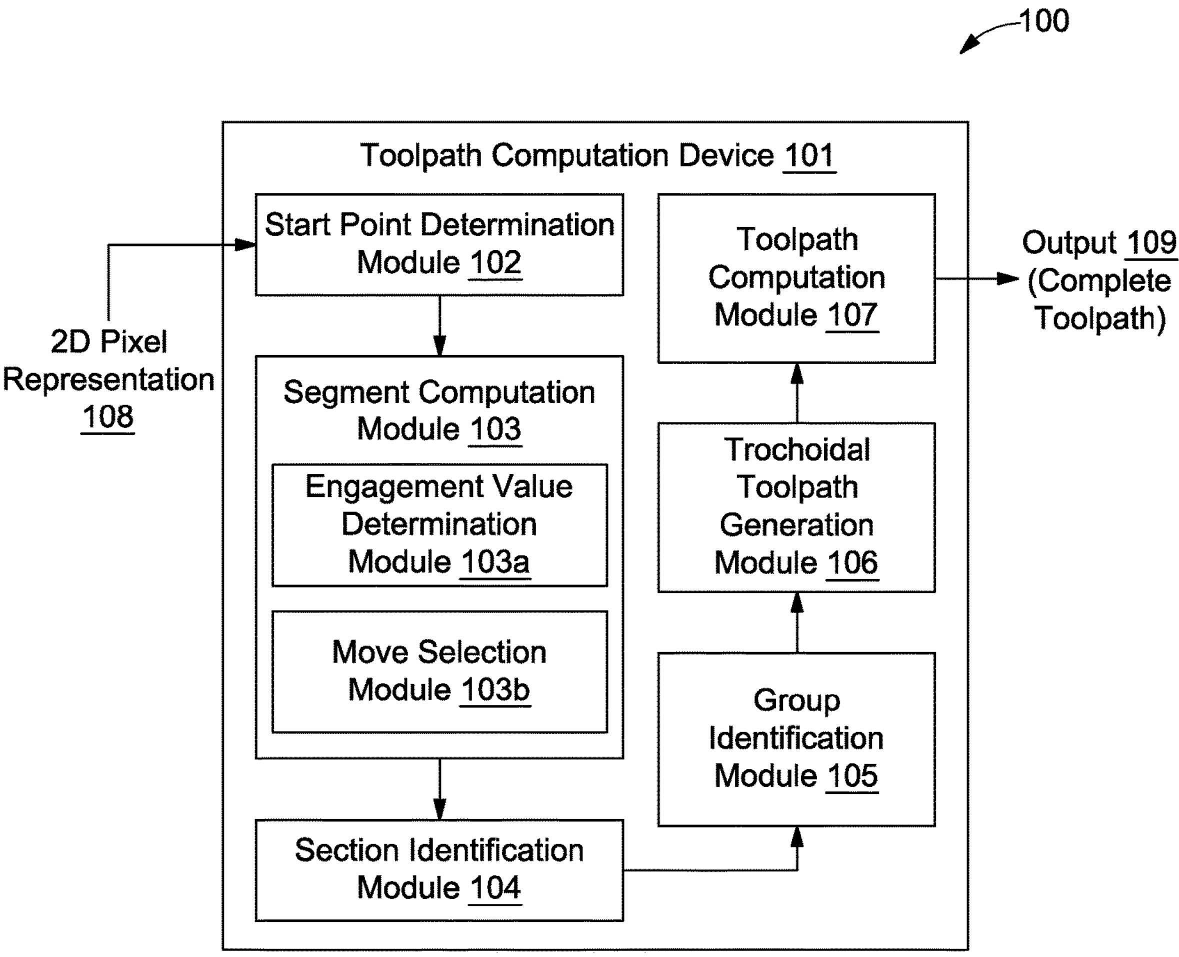
FIG. 1 illustrates a block diagram of a system for computing a toolpath for machining a pocket on a raw material body, in accordance with some embodiments of the present disclosure.

Referring now to FIG. 1, a system 100 for computing a toolpath for machining a pocket on a raw material body is illustrated, in accordance with some embodiments of the present disclosure. The system 100 includes a toolpath computation device 101 which further includes a start point determination module 102, a segment computation module 103, a section identification module 104, a group identification module 105, a trochoidal toolpath generation module 106, and a toolpath computation module 107. Further, the toolpath computation device 101 may also include a data store (not shown in FIG. 1) to store intermediate results generated by the modules 102-107.

In some embodiments, the start-point determination module 102 may be configured to receive a 2-dimensional (2D) pixel representation 108 corresponding to a cross-section of each of a machining tool and the pocket. Further, in some other embodiments, the start-point determination module 102 may determine a start point for the toolpath from the 2D pixel representation 108. It should be noted that the toolpath may include a plurality of segments. In order to determine the start-point, a Euclidean distance transform may be computed for the pocket. A grassfire technique may be used to compute the Euclidean distance. Further, a discrete medial axis corresponding to the pocket shape may be obtained by thresholding of a maximum value in the Euclidean distance transform. Further, one or more points from the discrete medial axis may be selected as potential start points for the toolpath.

In some embodiments, at each start point of the toolpath a plunge hole may be created. It should be noted that the diameter of each of the plunge holes may be larger than a diameter of the machining tool. Further, in some embodiments, to obtain a set of raw toolpaths, a raw toolpath may be computed based on each of the set of start points and plunge holes. It should be noted that each of the set of plunge holes may correspond to a starting point for each of the set of raw toolpaths. Additionally, in some embodiments, an optimal raw toolpath from the set of raw toolpaths may be selected. It should be noted that a simulation of each of the set of raw toolpaths may be considered for the raw toolpath selection.

The segment computation module 103 may be configured to compute each of subsequent segments in the toolpath. In order to compute each of subsequent segments in the toolpath, the segment computation module 103 may further include an engagement value determination module 103*a* to determine tool engagement values based on the 2D pixel representation 108. The tool engagement values may correspond to a plurality of potential moves of the machining tool with the raw material body. The segment computation module 103 may also include a move selection module 103*b* configured for selecting a move with a corresponding tool engagement value closest to a required tool engagement value from the plurality of potential moves. Alternatively, when the determined tool engagement value is not positive, the move selection module 103*b* may select a move as a next move that follows a boundary of the pocket. It should be noted that the engagement value for a toolpath segment is determined based on identifying a change in number of pocket pixels when the machining tool is rendered at, at least one of the start point of the toolpath segment, and at each of the start point and the end point of the toolpath segment.

In some embodiments, the section identification module 104 may be configured to identify a set of cutting sections. In some other embodiments, the section identification module 104 may be configured to identify a set of non-cutting sections. To identify the set of cutting sections and the non-cutting sections, the section identification module 104 may consider the engagement value at each toolpath segment. It should be noted that the engagement value of the machining tool with the raw material body may be greater than a predefined threshold number, for each of the set of cutting sections. Also, it should be noted that the engagement value of the machining tool with the raw material body may be less than a predefined threshold number, for each of the set of non-cutting sections.

In some embodiments, the group identification module 105 may be configured for identifying a plurality of trochoidal region groups from the set of cutting sections in the raw toolpath. In some other embodiments, the group identification module 105 may be configured to identify a plurality of boundary region groups from the set of non-cutting sections in the raw toolpath. The plurality of trochoidal region groups may include a plurality of approximately parallel curvilinear cutting sections. The plurality of boundary region groups may include a plurality of overlapping non-cutting sections.

The trochoidal toolpath generation module 106 may be configured for joining an end point of a first curvilinear cutting section with a start point of a second curvilinear cutting section through a link move to obtain a trochoidal toolpath. This may be performed for each of the plurality of trochoidal region groups in the raw toolpath.

The toolpath computation module 107 may be configured to compute a complete toolpath from the raw toolpath. The complete toolpath may be computed based on the trochoidal toolpath and the plurality of boundary region groups. In some embodiments, while traversing each of the plurality of toolpath segments on the trochoidal toolpath, the toolpath computation module 107 may add the trochoid if the toolpath segment belongs to the trochoid and the trochoid has not already been added to the toolpath. Further, in some embodiments, the toolpath computation module 107 may add the smallest non-cutting section in the boundary group upon encountering a non-cutting segment that belongs to a boundary region group. It should be noted that the non-cutting section may previously not have been included in the toolpath. Additionally, in some embodiments, gaps may be identified and patched in the toolpath using additional segments, by the toolpath computation module 107.

To identify and patch the gaps in the toolpath, in some embodiments, the toolpath computation module 107 may determine whether an end point of the toolpath segment is concurrent with a start point of a next toolpath segment. Further, a rapid link move may be created move between the start point and the end point when the end point of the toolpath segment is not concurrent with the start point of the next toolpath segment. Additionally, upon detecting a gouge on the rapid link move, an alternate non-gouging rapid link move may be created. To create the alternate non-gouging rapid link move, the rapid link move may be modified to follow the boundary of the pocket in the section where the gouge is detected.

Further, the toolpath computation device 101 may also include a corner identification module and a smoothening module (not shown in FIG. 1). The corner identification module may be configured to identify sharp corners in the complete tool path. The smoothening module may be configured to smoothen the sharp corners. For this, the smoothening module may repeatedly convolve a smoothening operator over the complete toolpath till a predefined level of smoothness is obtained. This is further explained in conjunction with FIG. 13.

The toolpath computation device 101 preferably uses a discrete simulation of the cutting process. Also, a more geometric approach for computing the tool engagement may also be used to drive the complete toolpath. The toolpath computation device 101 may be used for both simple and complex, open and closed pockets, additionally containing zero or more islands.

It should be noted that the system 100 and associated toolpath computation device 101 may be implemented in programmable hardware devices such as programmable gate arrays, programmable array logic, programmable logic devices, or the like. Alternatively, the toolpath computation device 101 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for computing a toolpath for machining a pocket on a raw material body. For example, the exemplary system 100 and associated toolpath computation device 101 may compute the toolpath, by the process discussed herein. In particular, as will be appreciated by those of ordinary skill in the art, control logic and/or automated routines for performing the techniques and steps described herein may be implemented by the system 100 and associated toolpath computation device 101 either by hardware, software, or combinations of hardware and software. For example, suitable code may be accessed and executed by the one or more processors on the toolpath computation device to perform some or all of the techniques described herein. Similarly, application specific integrated circuits (ASICs) configured to perform some or all the processes described herein may be included in the one or more processors on the system 100 and associated toolpath computation device 101.

Figure 2:
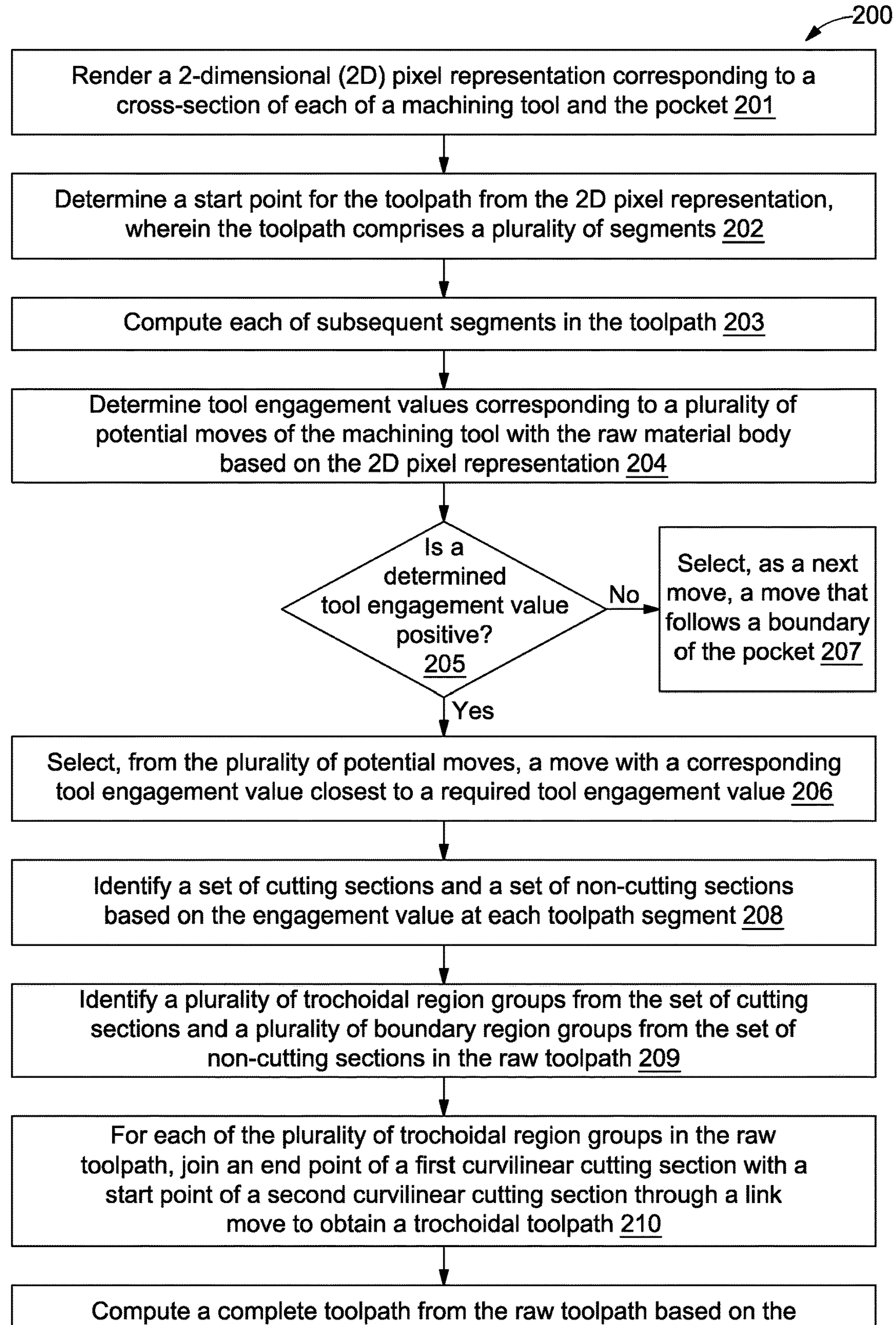
FIG. 2 illustrates a flow diagram of an exemplary process for computing a toolpath for machining a pocket on a raw material body, in accordance with some embodiments of the present disclosure.

Referring now to FIG. 2, an exemplary process 200 for computing a toolpath for machining a pocket on a raw material body is depicted via a flow diagram, in accordance with some embodiments of the present disclosure. Each step of the process 200 may be performed by a toolpath computation device (similar to the toolpath computation device 101). FIG. 2 is explained in conjunction with FIG. 1.

At step 201, a 2-dimensional (2D) pixel representation corresponding to a cross-section of each of a machining tool and the pocket (same as the 2D pixel representation 108) may be rendered. The 2D pixel representation 108 may be provided to a start point determination module (same as the start point determination module 102). Further, at step 202, a start point may be determined for the toolpath from the 2D pixel representation using the start point determination module. The toolpath may include a plurality of segments. In order to determine the start-point, in some embodiments, a Euclidean distance transform may be computed for the pocket using a grassfire technique. Further, in some embodiments, a discrete medial axis corresponding to the pocket shape may be obtained by thresholding of a maximum value in the Euclidean distance transform. Further, in some embodiments, one or more points from the discrete medial axis may be selected as potential start points for the toolpath.

Additionally, in some embodiments, at each start point of the toolpath a plunge hole may be created. It should be noted that the diameter of each of the plunge holes may be larger than a diameter of the machining tool. Further, in some embodiments, to obtain a set of raw toolpaths, a raw toolpath may be computed based on each of the set of start points and plunge holes corresponding to a starting point for each of the set of raw toolpaths. In some embodiments, an optimal raw toolpath from the set of raw toolpaths may be selected. A simulation of each of the set of raw toolpaths may be considered for the raw toolpath selection.

At step 203, each of subsequent segments may be computed in the toolpath using a segment computation module (similar to the segment computation module 103). Thereafter, at step 204, tool engagement values corresponding to a plurality of potential moves of the machining tool with the raw material body may be determined based on the 2D pixel representation. For determining the tool engagement values an engagement value determination module (same as the engagement value determination module 103*a*) may be employed.

At step 205, whether the determined tool engagement value is positive may be checked using a move selection module (similar to the move selection module 103*b*). In case of positive value, at step 206, a move with a corresponding tool engagement value closest to a required tool engagement value may be selected by the move selection module. Otherwise, when the determined tool engagement value is not positive, at step 207, a move that follows a boundary of the pocket may be selected as a next move by the move selection module.

It should be noted that the engagement value for a toolpath segment is determined based on identifying a change in number of pocket pixels when the machining tool is rendered at, at least one of the start point of the toolpath segment, and at each of the start point and the end point of the toolpath segment.

At step 208, a set of cutting sections and a set of non-cutting sections may be identified. For identification, a section identification module (same as the section identification module 104) may be used. The engagement value at each toolpath segment may be considered to identify the set of cutting sections and the set of non-cutting sections. It should be noted that the engagement value of the machining tool with the raw material body may be greater than a predefined threshold number, for each of the set of cutting sections. Also, it should be noted that the engagement value of the machining tool with the raw material body may be less than a predefined threshold number, for each of the set of non-cutting sections.

At step 209, a plurality of trochoidal region groups and a plurality of boundary region groups in the raw toolpath may be identified through a group identification module (such as the group identification module 105.) The plurality of trochoidal region groups may be identified from the set of cutting sections. And, the plurality of boundary region groups may be identified from the set of non-cutting sections. It should be noted that the plurality of trochoidal region groups may include a plurality of approximately parallel curvilinear cutting sections, and the plurality of boundary region groups may include a plurality of overlapping non-cutting sections.

At step 210, an end point of a first curvilinear cutting section may be joined with a start point of a second curvilinear cutting section, for each of the plurality of trochoidal region groups in the raw toolpath. It should be noted that the points may be joined through a link move to obtain a trochoidal toolpath. This is further explained in detail in conjunction with FIG. 12. A trochoidal toolpath generation module (same as the trochoidal toolpath generation module 106) may be used.

At step 211, a complete toolpath may be computed from the raw toolpath using a toolpath computation module (analogous to the toolpath computation module 107). It should be noted that the trochoidal toolpath and the plurality of boundary region groups may be considered for computing the complete toolpath. In some embodiments, while traversing each of the plurality of toolpath segments on the trochoidal toolpath, the trochoid may be added if the toolpath segment belongs to the trochoid and the trochoid has not already been added to the toolpath. Further, in some embodiments, the smallest non-cutting section may be added in the boundary group upon encountering a non-cutting segment that belongs to a boundary region group. It should be noted that the non-cutting section may previously not have been included in the toolpath. Additionally, in some embodiments, gaps may be identified and patched in the toolpath using additional segments.

Further, in some embodiments, whether an end point of the toolpath segment is concurrent with a start point of a next toolpath segment may be determined to identify and patch the gaps in the toolpath. Further, a rapid link move may be created move between the start point and the end point when the end point of the toolpath segment is not concurrent with the start point of the next toolpath segment. Additionally, upon detecting a gouge on the rapid link move, an alternate non-gouging rapid link move may be created. To create the alternate non-gouging rapid link move, the rapid link move may be modified to follow the boundary of the pocket in the section where the gouge is detected.

Further, in some embodiments, sharp corners in the complete tool path may be identified using a corner identification module. Moreover, in some embodiments, the sharp corners may be smoothened using a smoothing module. For this, a smoothening operator may be repeatedly convolved over the complete toolpath till a predefined level of smoothness is obtained. This is further explained in conjunction with FIG. 13.

Figure 3:
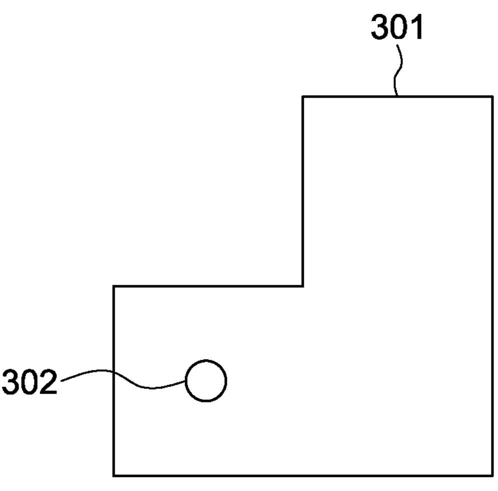
FIG. 3 illustrates an L-shaped pocket and a plunge hole, in accordance with some embodiments of the present disclosure.

Referring now to FIG. 3, an L-shaped pocket 301 and a plunge hole 302 are illustrated, in accordance with some embodiments of the present disclosure. FIG. 3 is explained in conjunction with FIGS. 1-2. A discrete simulation framework preferably includes a hardware accelerated Two Dimensional (2D) rendering engine. The 2D rendering engine is employed for rendering a pocket, a tool, a toolpath and plunge holes, on screen or onto an offscreen buffer. As illustrated in FIG. 3, the L-shaped pocket 301 and the plunge hole 302 may be rendered. The L-shaped pocket 301 may be rendered in a first color (for example, in a grey color) on a second colored background 306 (for example, on a teal-colored background). The plunge-hole 302 from where a machining process is to be started may be rendered in third (for example, a black-colored plunge hole).

It should be noted that within the simulation framework, the toolpath may be computed as a polyline including very small segments of equal length, and the tool engagement over each segment is approximated by new pocket pixels that get overwritten when the tool is rendered at the start and end points of the segment. An output toolpath may be a polyline composed of several small segments and therefore they may not be appropriate for older Computer Numerical Control (CNC) machines. Further, the problem may be alleviated using the Douglas-Peucker algorithm which significantly helps in reducing number of points in the toolpath. Also, modern Numerical Control (NC) controllers may smoothen toolpaths including the small segments and this feature may be enabled with a G64 Geometric Code (G-code) instruction. Further, a pixel-based tool engagement computation is explained in conjunction with FIG. 4.

Figure 4:
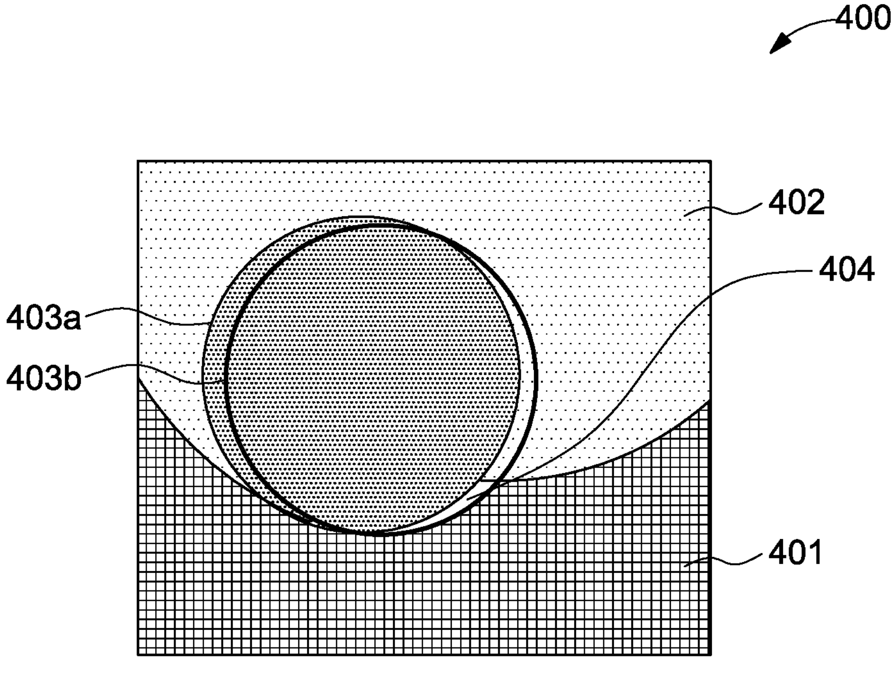
FIG. 4 illustrates pixel-based tool engagement, in accordance with some embodiments of the present disclosure.

Referring now to FIG. 4, a pixel-based tool engagement 400 is illustrated, in accordance with some embodiments of the present disclosure. FIG. 4 is explained in conjunction with FIGS. 1-3. The pixel-based tool engagement computation 400 includes a pocket material 401, a material 402 that has already been cut, a tool located at a position 'p' 403*a* and at a position 'p+1' 403*b*, an additional material 404 that may cut when the tool is moved from the position 'p' 403*a* to the position 'p+1' 403*b*. It should noted that a count of the additional material 404 pixels in FIG. 4 is around '40' (which includes pixels hidden by the tool 404) may form a measure of a tool engagement for this potential move. Also, it should be noted that from this pixel engagement count, a tool engagement angle may also be approximated, if required. In some embodiments, when the tool is moved smoothly and in equal increments, the pixel count is directly proportional to the engagement angle. In each step, the tool may be moved by a delta movement. The delta movement should be selected appropriately depending on a required engagement angle and resolution at which the simulation is being rendered. Selection of a small delta move may result in cutting only a few of pixels in each step and providing only a rough estimate of the tool engagement which may be noisy. On the other hand, a large delta move selection may provide a faceted and inaccurate tool path. Therefore, the delta move should be selected carefully.

Referring now to FIGS. 5A and 5B, an L-shaped pocket 500 (similar to the L-shaped pocket 301) is illustrated, in accordance with some embodiments of the present disclosure. FIGS. 5A and 5B are explained in conjunction with FIGS. 1-4. FIG. 5A represents a Euclidean distance transform 501 of the L-shaped pocket 500. In an embodiment, a point with the largest value on the discrete medial axis 502 may be selected and a plunge hole of diameter a little larger than a tool diameter may be made on that location. In other words, a point farthest from a surrounding pocket boundary may be selected on the discrete medial axis 502. In an alternate embodiment, a plunge location may be selected manually or determined using different techniques. Further, the tool may be placed in the plunge hole and moved incrementally in small movements in a pre-determined direction until it starts cutting the material. Once the tool starts cutting the material, next moves may be selected in such a way that amount of material cut always lies within a certain narrow range and each subsequent move forms a small angle from a previous move. It should be noted that these constraints are sufficient to create a spiral toolpath that may stop when the tool hits a first boundary.

Additional heuristics are therefore needed to keep the tool moving to machine cornered regions and other regions of the pocket. In some embodiments, the positions where the tool transitions from cutting some material to cutting no material and from cutting no material to cutting some material may be demarcated. Within such demarcated points, the system

100 follows a similar strategy to the initial spiral strategy to remove material using trochoidal-like moves. Thus, material may be machined without performing any geometric computation and using simple heuristics.

The Euclidean distance transform 501 may be computed using a grassfire algorithm. Further, FIG. 5B represents a discrete medial axis 502 in the Euclidean distance transform 501. The discrete medial axis 502 may be obtained by first computing Euclidean distance transform 501, and then thresholding maximum value in this transform. It should be noted that one or more points from the discrete medial axis 502 may be selected for creating one or more plunge holes (for example the plunge hole 302). For a different plunge hole location in the discrete medial axis 502, the resulting toolpath may be different. Therefore, multiple toolpaths may be created by choosing different plunge hole locations. Further, the best among the resulting toolpaths may be presented. Additionally, in some embodiments, more than one location may be chosen from the medial axis for creating plunge holes.

Referring now to FIGS. 6A and 6B, material cut 602, 603 and tool engagement, and toolpath 601 computed, through a simple spiral toolpath strategy are illustrated, in accordance with some embodiments of the present invention. FIGS. 6A and 6B are explained in conjunction with FIGS. 1-5. As explained above, a simple spiral toolpath that terminates when a tool hits the boundary of a pocket may be obtained using simple heuristics. Such strategy is only able to cut a circular region within a pocket. Algorithm 1 based on the simple spiral toolpath strategy is used. The algorithm 1 may be called repeatedly to determine next movements of the tool. It should be noted that the algorithm 1 may not include error checking and some boundary conditions which makes the algorithm easy.

Algorithm 1: Simple spiral toolpath strategy:

```
Input: P_tp = [p_1, p_2, ... ,p_n] // points comprising the toolpath
  A_max // the maximum angle to try
  Constants:
    δ_step // toolpath step size
    ε_min, ε_max // minimum and maximum acceptable engagement
  begin
    A_ang ← [0°, ±1°, ±2°, ..., ±A°_max]
    d_last ← p_n − p_{n−1} // direction of the last toolpath segment
    for a ∈ A_ang do
      d_rot ← rotate d_last by a
      p_to ← p_n + d_rot * δ_step
      ε ← checkEngagement(p_n, p_to)
      if ε_min ≤ ε ≤ ε_max then
        P_tp ← [P_tp; p_to]
        return
      end
    end
  end
```

Here, '$P_{tp}$' includes a list of points representing a current toolpath as a line strip or equivalently as a poly-line. If a valid next point to a move is found, then it is appended to the current toolpath. Further, '$A_{max}$' represents a maximum angle by which a toolpath segment may deviate from a previous segment. '$A_{max}$' along with a step size '$\delta_{step}$' controls smoothness of the generated toolpath. A smaller maximum angle '$A_{max}$' and a smaller '$\delta_{step}$' may result in a smoother toolpath. It should be noted that the '$\delta_{step}$' depends on resolution of rendering simulation and has a minimum value beyond which it may not be decreased. The 'checkEngagement' function computes the tool engagement as the tool moves from a position '$p_n$' to '$p_{to}$'. The algorithm 1 essentially tries out and greedily accepts a first move with the smallest angular deviation from a previous direction when the engagement criteria is met.

FIG. 6A represents material that has been cut using the toolpath 601 represented in FIG. 6B through the simple spiral strategy. In some embodiments, the material cut 602 and 603 may be rendered in different shades, where increasingly values corresponding to material cut 602 indicate increasing tool engagement. Please note that the tool engagement may be somewhat high initially as indicated by material cut 601 rendering of the tool near a plunge at the start of the toolpath 603. Otherwise, such a toolpath may be unsatisfactory since it may machine only a small portion of the overall pocket. The initial large tool engagement may be avoided by letting the algorithm 1 explore a larger range of angles, since initially somewhat higher curvature may be required to reproduce an approximation of the spiral toolpath 603. Also, it should be noted that that the toolpath is not exactly spiral. This is because the first algorithm is a greedy algorithm where the first valid angle is chosen where the tool engagement falls within a given range.

Figure 7A:
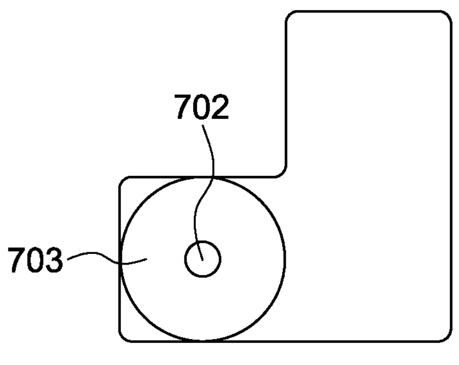
FIGS. 7A and 7B illustrate material cut and tool engagement, and toolpath computed, through a simple brute-force/non-greedy toolpath strategy, in accordance with some embodiments of the present disclosure.
Figure 7B:
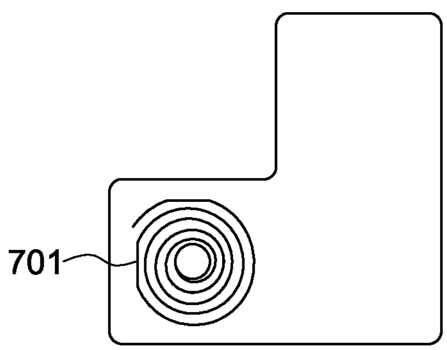

Referring now to FIGS. 7A and 7B, material cut 702, 703 and tool engagement, and toolpath 701 computed, through a simple brute-force/non-greedy toolpath strategy, are illustrated, in accordance with some embodiments of the present invention. FIGS. 7A and 7B are explained in conjunction with FIGS. 1-6. A modified algorithm i.e., algorithm 2 is explained, and corresponding cutting states and the toolpath 703 are represented in FIGS. 7A and 7B. As illustrated in FIGS. 7A and 7B, this strategy may result in the toolpath 703 that is closer to an Archimedean spiral. With this modified strategy, if range of angles is increased to check for the best direction to ±30°, then it may be possible to move in straight segments along the boundary.

Although, during these moves the tool engagement falls well below the target engagement, and therefore the tool engagement constraint must be relaxed. It may be possible to cover the whole pocket if tool engagement evaluation is allowed over a larger range and some heuristics are added to make the move along the boundary when it is not cutting any material. However, this may require evaluating a larger range of angles which may be computationally expensive. This performance hit may be largely avoided by evaluating a small range of angles first and then expanding the range gradually if good enough tool engagement is not found in the current range of angles.

Algorithm 2: Simple brute-force/non-greedy toolpath strategy:

```
Input: P_tp = [p_1, p_2, ... , p_n] // points comprising the toolpath
  A_max // the maximum angle to try
Constants:
  δ_step // toolpath step size
  ε_tar // target required engagement
begin
  A_ang ← [0°, ±1°, ±2°, ..., ±A°_max]
  d_last ← p_n − p_{n−1} // direction of the last toolpath segment
  Δ_best ← INT_MAX // the smallest difference from target engagement
  p_best // the best position to move to
  for a ∈ A_ang do
    d_rot ← rotate d_last by a
    p_to ← p_n + d_rot * δ_step
    ε ← checkEngagement(p_n, p_to)
    if | ε − ε_tar | < Δ_best then
      Δ_best ← | ε − ε_tar |
      p_best ← p_to
```

-continued

| Algorithm 2: Simple brute-force/non-greedy toolpath strategy: |
|---|

```
        end
    end
    P_tp ← [P_tp, p_best]
end
```

Figure 8A:
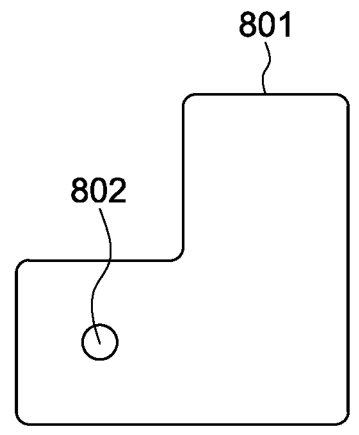
FIGS. 8A and 8B illustrate material cut and tool engagement, and computed toolpath, through a non-greedy boundary-following toolpath strategy, in accordance with some embodiments of the present disclosure.
Figure 8B:
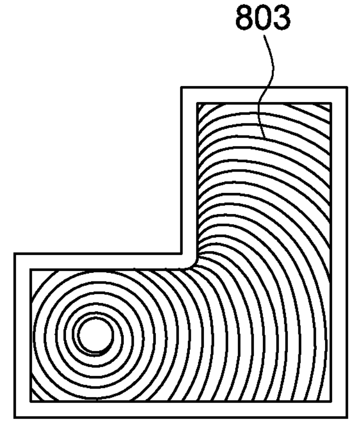

Referring now to FIGS. 8A and 8B, material cut 801, 802 and tool engagement, and toolpath 803 computed, through non-greedy boundary following toolpath strategy, are illustrated, in accordance with some embodiments of the present invention. FIGS. 8A and 8B are explained in conjunction with FIGS. 1-7. The only remaining problem in the algorithm 2 is sticking to the boundary of the pocket when the tool is not cutting any material. This may be done by allowing the "checkEngagement" function to return a special value when it detects a gouge. The algorithm may then select a next non-gouging angle as a direction to move next. A modified version of that algorithm (i.e., algorithm 3) is further explained here.

| Algorithm 3: non-greedy boundary following toolpath strategy: |
|---|

```
Input: P_tp = [p_1, p_2, ..., p_n] // points comprising the toolpath
Constants:
  δ_step // toolpath step size
  ε_tar // target required engagement
  begin
  d_last ← p_n − p_{n−1} // direction of the last toolpath segment
  Δ_best ← ε_tar // the smallest difference from target engagement
  p_best // the best position to move to
  θ ← 0
  ⊖ // angle by which to increase the range
    while !found do
      A_ang ← [±θ°, ±θ +1°, ...,±θ + ⊖°]
      foundBoundary = false
      for a ∈ A_ang do
        d_rot ← rotate d_last by a
        p_to ← p_n + d_rot * δ_step
        ε ← checkEngagement(p_n, p_to)
        if ε = −1 then
          foundBoundary = true
        end
        if | ε − ε_tar | ≤ Δ_best then
          Δ_best ← | ε − ε_tar |
          p_best ← p_to
          found = true
          if foundBoundary then
            P_tp ← [P_tp, p_best]
            return
          end
        end
      end
      θ + θ + ⊖
    end
    P_tp ← [P_tp, p_best]
end
```

Figures 9A, 9B:
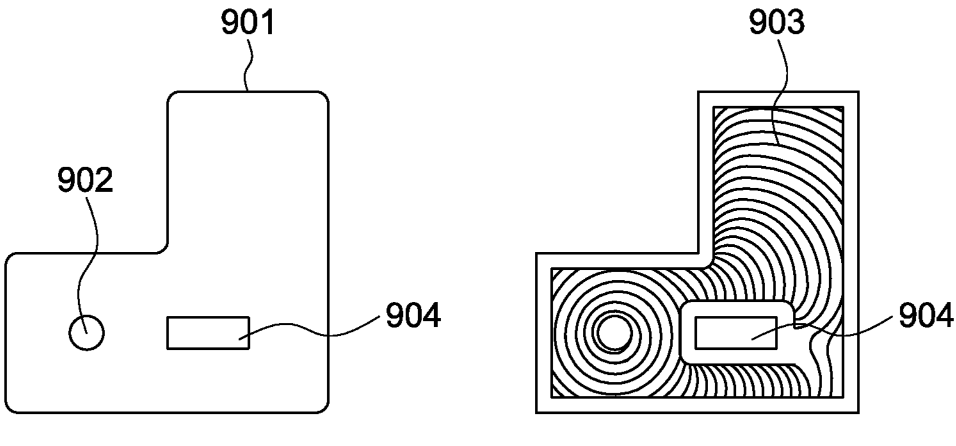
FIGS. 9A and 9B illustrate material cut and tool engagement, and computed toolpath, through a non-greedy boundary-following toolpath strategy, in accordance with some embodiments of the present disclosure.

Referring now to FIGS. 9A and 9B, material cut 901, 902 and tool engagement, and toolpath 903 computed, through the non-greedy boundary following toolpath strategy, are illustrated, in accordance with some embodiments of the present invention. The L-shaped pocket as represented in FIGS. 9A and 9B also includes an island 904. Further, the algorithm 3 (as explained in conjunction with FIG. 8) may be used here without requiring any special changes. Only a small portion on the island 904 is left unmachined. However, from the shape of the left-over portion, the island 904 has a thin tip which can potentially break while machining causing possible surface damage.

Figures 10A, 10B:
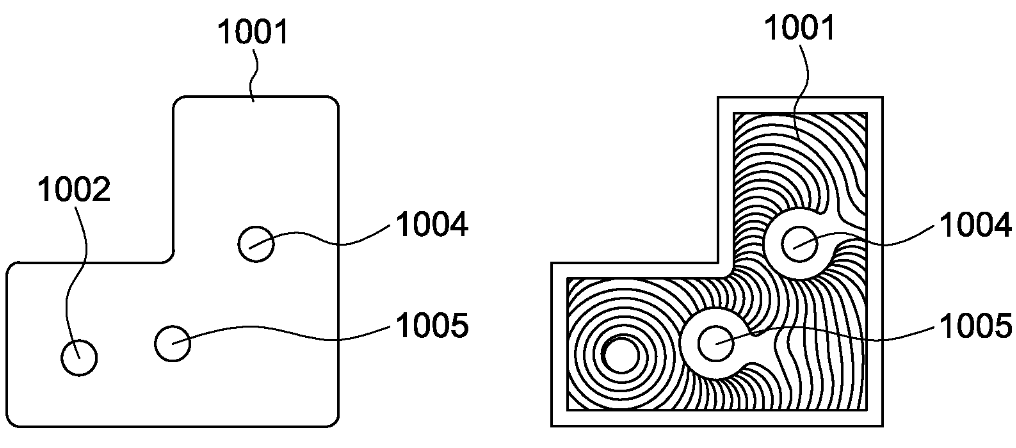
FIGS. 10A and 10B illustrate material cut and tool engagement, and toolpath computed, through non-greedy boundary following toolpath strategy, in accordance with some embodiments of the present disclosure.

Referring now to FIGS. 10A and 10B, material cut 1001, 1002 and tool engagement, and toolpath 1003 computed, through non-greedy boundary following toolpath strategy, are illustrated, in accordance with some embodiments of the present invention. The L-shaped pocket as represented in FIGS. 10A and 10B also include islands 1004 and 1005. Further, the algorithm 3 (as explained in conjunction with FIG. 8) may be used here without requiring any special changes. Only a small portion of the islands 1004 and 1005 is left unmachined. However, from the shape of the left-over portion, each of the islands 1004 and 1005 have a thin tip which can potentially break while machining causing possible surface damage.

The algorithm 3 may become more readable by refactoring it into two parts including a part that computes the best spiral move and a part that ensures that the tool moves along the boundary when no other moves are possible. Additionally, efficiency of the algorithm 3 may be improved by exploring different angle ranges in stages. However, this requires caching engagement values at each step and using the cached values when evaluating the best move and when moving along the boundary.

| Algorithm 4: Simple engagement caching method: |
|---|

```
Constants:
  P_from // point from where the algorithm is exploring
  d_last // the direction of the last segment
  δ_step // toolpath step size
Globals:
  C : θ → {p_to, ε} // global map from angles to point, engagement pairs
  Function GetEngagement(θ):
  if C(θ) then
    return C(θ)
  end
  d_rot ← rotate d_last by a
  P_to ← P_from + d_rot * δ_step
  ε ← checkEngagement(p_n, p_to)
  C(θ) ← {p_to, ε}
return C(θ)
```

Here, the current location of the tool '$p_{from}$', the direction of the last toolpath segment '$d_{last}$', and the toolpath step size '$\delta_{step}$' are constants for a particular step. $C:\theta \rightarrow \{p_{to}, \varepsilon\}$ is the global map where the engagement 'ε' may be stored for the explored angles "θ'. This cache helps to improve performance because the same ranges must be explored to determine a spiral move, and when that fails, a move should be determined along the boundary. Performing both the steps as performed in the third algorithm leads to a more complicated and error-prone implementation. Therefore, a 'GetEngagement' function may be used to compute and retrieve the tool engagement assuming that this value at each step may be cached for performance. It should be noted that this may be a per-step cache and the cache may be cleared after each step is completed.

A function that computes the best spiral move may be similar to the function of the algorithm 2. However, the algorithm 4 may be described better using a simpler pseudo-code. Similarly, an algorithm for following along the boundary when no other moves are available also becomes easy to understand. The overall strategy which calls these two functions includes only a few steps.

The function to compute the best spiral move is used in algorithm 5. The function takes a maximum angle range '$\theta_{max}$' as an input and if it is able to find a good move $p_{best}$ within this range then it returns true. The function loops through the angles in the range '$-\theta_{max}$ to $+\theta_{max}$', and for each angle in this range computes the tool engagement 'ε' and the magnitude 'δ' of its difference from the required engagement '$\varepsilon_{tar}$'. If this magnitude 'δ' difference is lesser than a small amount '$\delta_{tol}$' then the best position '$p_{best}$' is updated and returned. Else if this difference is smaller than the smallest difference '$\delta_{best}$' encountered so far, '$\delta_{best}$' may be updated with the new difference and also the best move position '$p_{best}$' may be updated. Also, a last if block may be checked when the 'δ' difference starts increasing beyond the best values found so far and return early when this happens. This last check essentially tries to determine when a local minima is found for the engagement 'δ' value in the given angle range. The end of the loop may be reached if the no best 'δ' that is less than '$\delta_{tol}$' is found. In this case, true may be returned if a valid engagement has been found else false.

Algorithm 5: Best spiral move function:

```
Constants:
ε_tar // target required engagement
δ_tol // max acceptable change from required engagement
Function FindBestMove(θ_max, p_best):
  δ_best ← ε_tar
  θ ← −θ_max
  while θ ≤ θ_max do
    {p, ε} ← GetEngagement(θ)
    δ ← | ε − ε_tar |
    if δ < δ_tol then
      p_best ← p
      return true
    end
    if δ < δ_best then
      δ_best ← δ
      p_best ← p
    end
    if δ_best < ε_tar and δ > δ_best then
      return true
    end
  end
  return δ < δ_best
```

The function to get the tool to follow the boundary of the pocket, in case of failure to find a valid engagement for a spiral move, is further included in algorithm 6. Similar to the 'FindBestMove' function, this function also takes maximum angle range '$\theta_{max}$' as an input. If a valid boundary move is found in this range, the function updates the value of the '$p_{best}$' parameter with the position to which to move and returns true. If no valid boundary move is found, then the function returns false. The boundary may be found easily by comparing the values of the current engagement 'ε' with that of the previous engagement '$\varepsilon_{prev}$'. If the previous engagement '$\varepsilon_{prev}$' is '−1' (recall that the checkEngagement function from the algorithm 1 and therefore the GetEngagement functions return −1 when a gouge is detected) and the current engagement is '0', then update the position '$p_{best}$' is updated with the current position 'p' and return true. Otherwise, if the previous engagement '$\varepsilon_{prev}$' is 0 and the current engagement is '0' then the value may be updated to that of the previous engagement and return true. If such a transition is not found, then the function returns false.

Algorithm 6: Boundary move function:

```
Function FindBoundaryMove(θ_max, p_best):
  − , ε_prev ← GetEngagement(−θ_max)
  θ + − θ_max + 1
  while θ ≤ θ_max do
    {p, ε} ← GetEngagement(θ)
    if ε_prev = −1 and ε = 0 then
      p_best ← p
      return true
    else if ε_prev = 0 and ε = −1 then
```

-continued

Algorithm 6: Boundary move function:

```
      {p, ε} ← GetEngagement(θ − 1)
      p_best ← p
      return true
    end
    ε_prev ← ε
  end
  return false
```

Finally, an overall algorithm for determining the next move, given the previously computed toolpath steps, may be built using the 'FindBestMove' and 'FindBoundaryMove' functions. An illustrative example is shown in algorithm 7. The algorithm 7, however, may be slow because for each step, the engagement may be evaluated over a 180° range (from −90° to +90°). A more efficient version may be constructed by evaluating the range in stages starting with smaller ranges. A possible optimization is further shown in Algorithm 8. Here the boundary move is first evaluated over a 4° range followed by evaluation of the spiral move in two stages, which is in turn followed by the evaluation of the boundary move in two further stages.

Algorithm 7: Overall move function:

```
Input: P_tp = [p_1, p_2, ...,p_n] // points comprising the toolpath
Constants:
  δ_step // toolpath step size
  ε_tar // target required engagement
Function FindNextMove(P_tp):
  p_from < p_n // point from where the algorithm is exploring
  d_last + p_n − p_n−1 // direction of the last toolpath segment
  p_to + p_n + d_last * δ_step // by default move in the last direction
  if FindBestMove(90, p_to) then
    return p_to
  end
  if FindBoundaryMove(90, p_to) then
    return p_to
  end
  return p_to
```

Algorithm 8: Overall move function:

```
Input: P_tp = [p_1, p_2, ..., p_n] // points comprising the toolpath
Constants:
  δ_step // toolpath step size
  ε_tar // target required engagement
Function FindNextMove(P_tp):
  p_from < p_n // point from where the algorithm is exploring
  d_last + p_n − p_n−1 // direction of the last toolpath segment
  p_to + p_n + d_last * δ_step // by default move in the last direction
  if FindBestMove(4, p_to) then
    return p_to
  end
  if FindBestMove(20, p_to) then
    return p_to
  end
  if FindBestMove(90, p_to) then
      return p_to
  end
  if FindBoundaryMove(20, p_to) then
  return p_to
  end
  if FindBoundaryMove(90, p_to) then
    return p_to
  end
    return p_to
```

This strategy provides a toolpath consisting of spiral and curvilinear moves. However, it also contains a lot of redundant moves along the boundary. It may be possible to avoid these redundant boundary moves using a more complicated strategy, but a more complicated strategy may be difficult to generalize across all possible pocket shapes. Additionally, a more complicated strategy may likely require a large number of heuristics to handle various edge cases and in general may make the implementation more difficult to debug and maintain. An easier and more robust method for removing the redundant boundary moves and converting the other curvilinear moves into trochoidal moves is to use an additional post-processing strategy.

The post-processing strategy for converting the toolpath generated from the previous boundary-following strategy into one with trochoidal moves can be broken down into several distinct steps. The post-processing strategy involves identifying cutting and non-cutting sections of the toolpath. Once the cutting and non-cutting sections are identified, the post-processing strategy involves identifying trochoidal groups among the cutting sections and, additionally, identifying overlapping boundary moves in the non-cutting sections. After the trochoidal groups are identified, the post-processing strategy involves connecting the curvilinear moves in each group to create the trochoidal toolpath in the cutting sections. Further, the post-processing strategy includes a composition step that connects the remaining spiral, curvilinear, and boundary moves with the trochoidal moves to create the complete toolpath. Lastly, the post-processing strategy involves smoothening out of sharp moves in the complete toolpath using a smoothing step. Each of the above steps are described in more detail in conjunction with subsequent FIGS.

It should be noted that the step of identifying the cutting and non-cutting sections can be easily performed using the tool engagement data for each toolpath segment obtained from the simulation output. Contiguous toolpath segments with zero engagement are grouped into a single non-cutting section and contiguous segments with engagement greater than zero are grouped into a single cutting section. A new data-structure called a 'region' is introduced which consists of a polyline and a boolean indicating if the region (i.e., a section) is one of a cutting section or non-cutting section. The procedure is shown in Algorithm 9.

Algorithm 9: Identifying cutting sections and non-cutting sections

```
Input:
  P_tp = [p_1, p_2, ..., p_n] // points comprising the toolpath
  E_tp = [ε_1, ε_2, ..., ε_n] // tool engagement values at each point
struct {
  polyline pl
  bool cutting
} Region
Function FindRegion(P_tp, E_tp, i_start):
  Pr ← [ ] // polyline for the region
  i ← i_start
  while i_start < n do
    if E_tp[i_start] > 0 ≠ E_tp[i] > 0 then
      return Region(P_r, E_tp[i_start] > 0)
    end
    P_r ← [P_r, P_tp[i]]
  end
  return Region(P_r, E_tp[i_start] > 0)
Function SegmentRegions(P_tp):
  R = [ ] // segmented regions
  i_start ← 0 // index from which to start segmenting
  while i_start < n do
```

-continued

Algorithm 9: Identifying cutting sections and non-cutting sections

```
      r = FindRegion(P_tp, E_tp, i_start)
      R ← [R, r]
      i_start ← i_start + length(r)
    end
    return R
```

Referring now to FIGS. 11A and 11B, trochoidal region grouping 1100A and boundary region grouping 1100B are illustrated, in accordance with some embodiments of the present disclosure. FIGS. 11A and 11B are explained in conjunction with FIGS. 1-10. FIG. 11A represents a typical condition under which cutting moves are grouped into trochoidal groups. FIG. 11A includes curves 1101, 1102, and 1103, which may be grouped into a trochoidal region. Further, the curves 1101, 1102, and 1103 include start points 1101*a*, 1102*a*, and 1103*a*, respectively. The curves 1101, 1102, and 1103 include end points start points 1101*b*, 1102*b*, and 1103*b*, respectively. Further, the distance between the curves 1101 and 1102 at start point 1102*a* is a distance 1104. Similarly, other computed distances include a distance 1105 between the curves 1101 and 1102 at the end point 1102*b*, a distance 1106, a distance 1107 between the curves 1102 and 1103 the at start point 1103*a* and the end point 1103*b*, respectively.

In order to check if the curves 1101, 1102, and 1103 are parallel, distance at the end point of a current curve from a curve on a top of a trochoidal stack 1108 approximately equal to the stepover distance of the tool. By way of an example, consider a situation where the curves 1101 and 1102 are already in the stack 1108 and the curve 1103 needs to be evaluated for possible inclusion in the same stack 1108. In that case, the distance 1106 and the distance 1107 may be evaluated at the start and the end points 1103*a* and 1103*b* from the curve 1102. If the distance 1106 and the distance 1107 are approximately equal to the stepover distance, then the curve 1103 may be included in the stack 1108.

Once cutting and non-cutting regions are segmented from a toolpath, the trochoidal groups may be identified from amongst the cutting regions. The trochoidal groups may be stored into stacks and identified by checking if a cutting move is approximately parallel with a distance equal to the depth of cut to another cutting move from the top of some existing stack. If such a stack is found then the cutting move is pushed into this stack, else a new stack is created with this cutting move. Further, it may be checked whether the cutting move (for example, the cutting move $t_3$) is approximately parallel to the cutting move (for example, the cutting move $t_2$) by checking a distance '$d_3$' of a start point '$s_1$' and an end point '$e_1$'. Checking the distance from the start and end points should suffice in most cases, however more exhaustive methods may also be used to determine if the regions are approximately parallel. The procedure is shown in algorithm 10, where the region data structure from the algorithm 9 is reused. It should be noted how an index of a trochoidal region is stored in the group stack instead of the trochoidal region itself.

Algorithm 10: Grouping trochoidal regions:

```
Input: R_tp = [r_1, r_2, ..., r_n] // regions in the toolpath
Constants:
  δ_cut // depth of cut
Function FindStack(r, S_trochoid, R_tp):
```

-continued

Algorithm 10: Grouping trochoidal regions:

```
  i ← 0
  while e < length(S_trochoid) do
    p ← top(S_trochoid[i])
    if r.pl ∥ p.pl then
      return i
    end
    i ← i + 1
  end
  return −1
Function Group Trochoids(R_tp):
  S_trochoid = [ ] // trochoidal stacks
  for r ϵ R_tp do
    if r.cutting then
      i ← FindStack(r, S_trochoid, R_tp)
      if i ≠ −1 then
        s ← [ s, i]
      else
        s ← [i]
        S_trochoid ← [S_trochoid, S]
      end
    end
  end
  return S_trochoid
```

Alongside grouping the trochoidal regions, overlapping non-cutting should be grouped. This is essential for composing a final toolpath. The algorithm for grouping the overlapping non-cutting regions is very similar to one for grouping the trochoidal regions. However, in this case, if one non-cutting region is a subset of larger regions, these regions are grouped together. This step is described in algorithm 11.

Algorithm 11: Grouping Boundary Regions

```
Input: R_tp = [r_1, r_2, ..., r_n] // regions in the toolpath
Constants:
  δ_cut // depth of cut
Function FindStack(r, S_boundary, R_tp):
  i ← 0
  while i < length(S_boundary) do
    p ← top(S_boundary[i])
    if r.pl ⊏ p.pl then
      return i
    end
    i ← i + 1
  end
  return −1
Function GroupBoundary(R_tp):
  S_boundary ← [ ] // boundary stacks
  for r ϵ R_tp do
    if r.cutting then
      i ← FindStack(r, S_boundary, R_tp)
      if i ≠ −1 then
        s ← [s, i]
      else
        s ← [i]
        S_boundary ← [S_boundary, s]
      end
    end
  end
  return S_boundary
```

Further, referring now to FIG. 11B, a grouping of overlapping boundary moves is represented. FIG. 11B includes boundary segments 1109, 1110, 1111, and a boundary stack 1112. Boundary moves may be rendered in thick lines to clearly indicate that they are overlapping. When traversing a segmented toolpath, the overlapping boundary moves, or non-cutting moves are encountered in the order of increasing lengths. The overlapping boundary moves may therefore be grouped by checking if end points of the segment on top of the boundary stack 1112 lie on a current boundary segment. By way of an example, consider that the segments 1109 and 1110 are already in the boundary stack 1112, and the boundary segment 1111 is encountered. In that case, to include the boundary segment 1111 in the boundary stack 1112, end points of the boundary segment 1110 on the top of the boundary stack 1112 should lie on the boundary segment 1111.

Referring now to FIG. 12, exemplary connections of trochoidal regions are illustrated, in accordance with some embodiments of the present disclosure. FIG. 12 is explained in conjunction with FIGS. 1-11A-11B. Before composing a complete toolpath, curves 1201, 1202, 1203 in each of the trochoidal regions should be connected. This may be easily done by connecting an end point of one curve with a start point of other next curve. In one example, an end point 1201*b* of the curve 1201 is connected to a start point 1202*a* of the curve 1202. In another example, an end point 1202*b* of the curve 1202 is connected to a start point 1203*a* of the curve 1203. The trochoidal curves 1201, 1202, 1203 are connected using straight line segments 1204 and 1205 and may result in sharp corners at connecting ends. Further, to eliminate the sharp corner, post-processing steps are further described.

Referring now to FIG. 13, an exemplary computed toolpath with trochoidal moves is illustrated, in accordance with some embodiments of the present disclosure. FIG. 13 is explained in conjunction with FIGS. 1-12. In order to compute the toolpath, it may be more efficient to first create a tagged version of a segmented toolpath, where each region in the toolpath is marked as either belonging to a trochoid group or a boundary group and includes an index of the group to which it belongs. Algorithm 12 for tagging procedure is given below.

Algorithm 12: Creating the Tagged Toolpath

```
Input: R_tp = [r_1, r_2, ..., r_n] // regions in the toolpath
struct {
  Region region
  bool trochoid
  int group
} TaggedToolpath
Function TagToolpath(R_tp, S_trochoid, S_boundary):
  T_tp ← [ ] // tagged toolpath
  for r ϵ R_tp do
    T_tp ← [r, false, −1]
  end
  i ← 0
  while i < length(S_trochoid) do
    for j ϵ S_trochoid[i] do
      T_tp[j].trochoid ← true
      T_tp[j].group ← i
    end
  end
  i ← 0
  while i < length(S_boundary) do
    for j ϵ S_boundary[i] do
      T_tp[j].trochoid ← false
      T_tp[j].group ← i
    end
  end
  return T_tp
```

Once the toolpath is tagged with each region in the toolpath associated with the trochoidal group or boundary group it belongs to, the of the complete may be started. An algorithm for composing the complete toolpath starts by looping over the tagged regions in the tagged toolpath. The first region belonging to the trochoid group is encountered, the whole trochoid group is added to the toolpath. Similarly, the first region belonging to the boundary group is encountered, the first and smallest region from the boundary group is added to the toolpath. Once the trochoid or the boundary group has been added further encounters with the groups may be ignored. Further, the composed toolpath is traversed to find any gaps in between the segments and are patched with linear moves. Algorithm 13 for composing the complete toolpath is given below.

Algorithm 13: Composing the complete toolpath

Input:<br>
$T_{tp}$ = [$t_1$, $t_2$, ..., tn] // regions in the tagged toolpath<br>
$S_{trochoid}$ = [$st_1$, $st_2$, ..., $st_m$] // trochoid stacks<br>
$S_{boundary}$ = [$sb_1$, $sb_2$, ..., $sb_k$] // boundary stacks<br>
$R_{trochoid}$ = [$rt_1$, $rt_2$, ..., $rt_m$] // trochoid regions<br>
Function CompToolpath($T_{tp}$, $S_{trochoid}$, $S_{boundary}$, $R_{trochoid}$):<br>
  $C_{tp}$ ← [ ] // composed toolpath<br>
  for t ∈ $T_{tp}$ do<br>
    if t.trochoid then<br>
      if $S_{trochoid}$[t.group].added then<br>
        $C_{tp}$ ← [$C_{tp}$, $R_{trochoid}$[t.group]]<br>
        $S_{trochoid}$[t.group].added = true<br>
      end<br>
    else<br>
      if $S_{boundary}$[t.group].added then<br>
        $b_{smallest}$ ← $T_{tp}$[$S_{boundary}$[t.group]][0]<br>
        $C_{tp}$ ← [$C_{tp}$, $b_{smallest}$]<br>
        $S_{boundary}$[t.group].added = true<br>
      end<br>
    end<br>
  end<br>
  $C_{tp}$ ← PatchGaps($C_{tp}$)<br>
  return $C_{tp}$ In the algorithm, the PatchGaps function checks if the end point of the last region and the start point of the next region are the same. If the points are not same, a rapid connecting move between these two points may be created. Sometimes these rapid connecting moves may lead to a gouge. Therefore, a gouge check is performed on the connecting moves by checking the smallest distance of these moves to a pocket boundary. If the gouge is detected, then an alternative non-gouging rapid move needs to be found.

For example, in some embodiments, a boundary following move is found that connects these segments. However more elaborate and optimal strategies may be used. An illustrative example of the resulting composed toolpath is shown in FIG. 13. Moves 1301 are the rapid connecting are rendered in dashed lines, while the moves 1302 are cutting moves.

Further, the sharp corners may be smoothened in the toolpath which may typically be found in the areas connecting the rapid link moves with the trochoid and other cutting segments. Since the toolpath is composed of small segments (for example, the link segments are also converted into equally small segments), smoothing the toolpath may be executed easily by convolving a smooth operator repeatedly over the toolpath until the desired smoothness is obtained.

Figure 14:
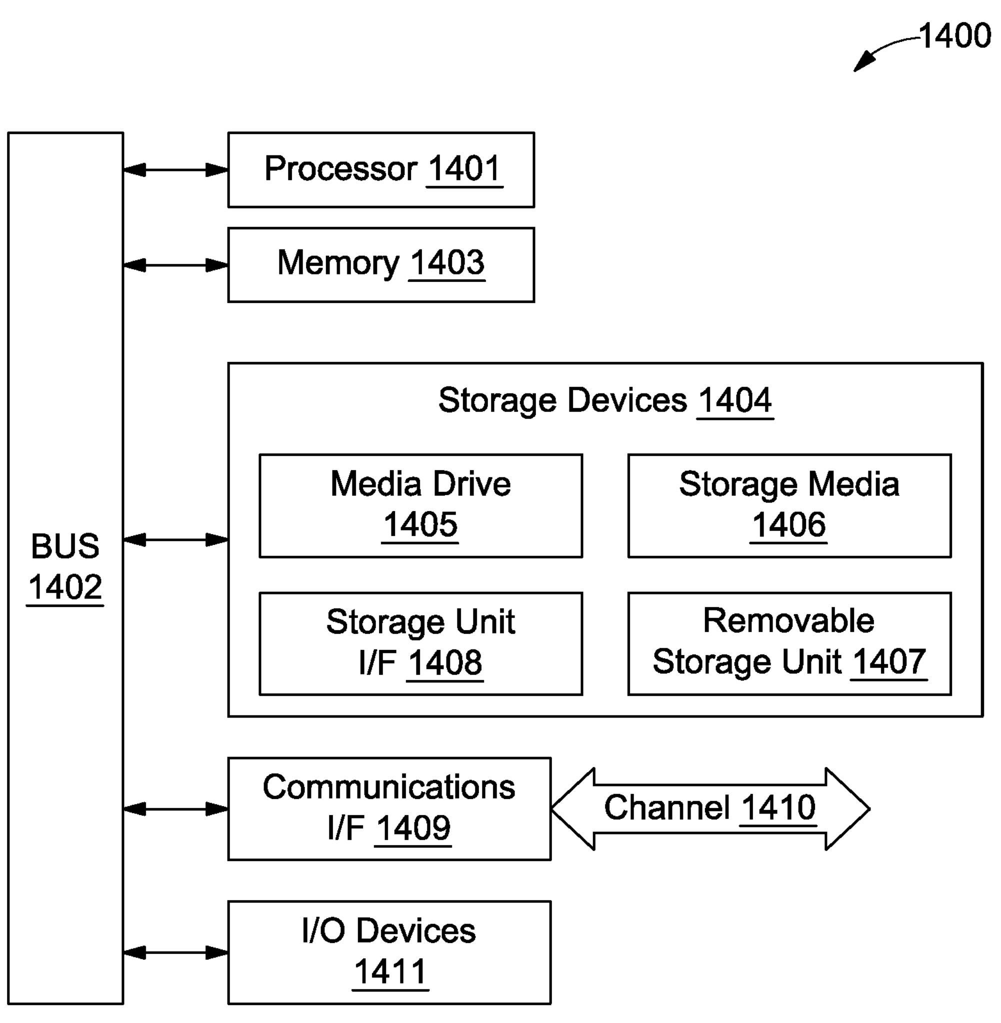
FIG. 14 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 14, an exemplary computing system 1400 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1400 may represent, for example, a user device such as a desktop, a laptop, a mobile phone, personal entertainment device, DVR, and so on, or any other type of special or general-purpose computing device as may be desirable or appropriate for a given application or environment. The computing system 1400 may include one or more processors, such as a processor 1401 that may be implemented using a general or special purpose processing engine such as, for example, a microprocessor, microcontroller or other control logic. In this example, the processor 1401 is connected to a bus 1402 or other communication medium. In some embodiments, the processor 1401 may be an AI processor, which may be implemented as a Tensor Processing Unit (TPU), or a graphical processor unit, or a custom programmable solution Field-Programmable Gate Array (FPGA).

The computing system 1400 may also include a memory 1403 (main memory), for example, Random Access Memory (RAM) or other dynamic memory, for storing information and instructions to be executed by the processor 1401. The memory 1403 also may be used for storing temporary variables or other intermediate information during execution of instructions to be executed by the processor 1401. The computing system 1400 may likewise include a read only memory ("ROM") or other static storage device coupled to bus 1402 for storing static information and instructions for the processor 1402.

The computing system 1400 may also include a storage device 1404, which may include, for example, a media drives 1405 and a removable storage interface. The media drive 1405 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 1406 may include, for example, a hard disk, magnetic tape, flash drive, or other fixed or removable medium that is read by and written to by the media drive 1405. As these examples illustrate, the storage media 1406 may include a computer-readable storage medium having stored there in particular computer software or data.

In alternative embodiments, the storage devices 1404 may include other similar instrumentalities for allowing computer programs or other instructions or data to be loaded into the computing system 1400. Such instrumentalities may include, for example, a removable storage unit 1407 and a storage unit interface 1408, such as a program cartridge and cartridge interface, a removable memory (for example, a flash memory or other removable memory module) and memory slot, and other removable storage units and interfaces that allow software and data to be transferred from the removable storage unit 1407 to the computing system 1400.

The computing system 1400 may also include a communications interface 1409. The communications interface 1409 may be used to allow software and data to be transferred between the computing system 1400 and external devices. Examples of the communications interface 1409 may include a network interface (such as an Ethernet or other NIC card), a communications port (such as for example, a USB port, a micro USB port), Near field Communication (NFC), etc. Software and data transferred via the communications interface 1409 are in the form of signals which may be electronic, electromagnetic, optical, or other signals capable of being received by the communications interface 1409. These signals are provided to the communications interface 1409 via a channel 1410. The channel 1410 may carry signals and may be implemented using a wireless medium, wire or cable, fiber optics, or other communications medium. Some examples of the channel 1410 may include a phone line, a cellular phone link, an RF link, a Bluetooth link, a network interface, a local or wide area network, and other communications channels.

The computing system 1400 may further include Input/Output (I/O) devices 1411. Examples may include, but are not limited to a display, keypad, microphone, audio speakers, vibrating motor, LED lights, etc. The I/O devices 1411 may receive input from a user and also display an output of the computation performed by the processor 1401. In this document, the terms "computer program product" and "computer-readable medium" may be used generally to refer to media such as, for example, the memory 1403, the storage devices 1404, the removable storage unit 1407, or signal(s) on the channel 1410. These and other forms of computer-readable media may be involved in providing one or more sequences of one or more instructions to the processor 1401 for execution. Such instructions, generally referred to as "computer program code" (which may be grouped in the form of computer programs or other groupings), when executed, enable the computing system 1400 to perform features or functions of embodiments of the present invention.

In an embodiment where the elements are implemented using software, the software may be stored in a computer-readable medium and loaded into the computing system 1400 using, for example, the removable storage unit 1407, the media drive 1405 or the communications interface 1409. The control logic (in this example, software instructions or computer program code), when executed by the processor 1401, causes the processor 1401 to perform the functions of the invention as described herein.

Thus, the present disclosure may overcome drawbacks of traditional systems discussed before. The system disclosed in the present disclosure requires a simple code for toolpath computation, requires low maintenance, provides heuristic algorithms to handle various edge and special cases, provides easy implementation, capable of complex pocket geometries handling, and capable of dealing different pocket shapes. The disclosure provides a low-code, easy to implement, and a simulation-driven method for generating curvilinear toolpaths for any pocket.

The system and method disclosed in the present disclosure may potentially be an integral part of a Computer Numerical Control (CNC) machine. The CNC machine equipped with a powerful graphic processing unit (GPU) or attached to a computer which has the powerful GPU is capable of computing the toolpath as described in the method in a reasonable time. The simple, generic and simulation driven nature of the disclosed algorithm also makes it possible to use application specific integrated circuits (ASIC) to further enhance performance of the algorithm. Additionally, the disclosed method and system require very little code and is, therefore, easy to implement and maintain. Writing a robust toolpath library using a computational geometry approach can take several years of programming effort by a team of experts. But, on the other hand, the disclosed method and system are easy to implement and do not require heuristic algorithms to handle various edge and special cases. The disclosed method and system can also handle very complex pocket geometries and can naturally work for different pocket shapes.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for computing a toolpath for machining a pocket on a raw material body, the method comprising:

rendering, by a toolpath computation device, a 2-dimensional (2D) pixel representation corresponding to a cross-section of each of a machining tool and the pocket;

determining, by the toolpath computation device, a start point for the toolpath from the 2D pixel representation, wherein the toolpath comprises a plurality of segments;

for computing each of subsequent segments in the toolpath, determining, by the toolpath computation device, tool engagement values corresponding to a plurality of potential moves of the machining tool with the raw material body based on the 2D pixel representation; and one of, selecting, from the plurality of potential moves, a move with a corresponding tool engagement value closest to a required tool engagement value; or selecting, as a next move, a move that follows a boundary of the pocket, when the determined tool engagement value is not positive;

identifying, by the toolpath computation device, a set of cutting sections and a set of non-cutting sections based on the engagement value at each toolpath segment;

identifying, by the toolpath computation device, a plurality of trochoidal region groups from the set of cutting sections and a plurality of boundary region groups from the set of non-cutting sections in the raw toolpath, wherein the plurality of trochoidal region groups comprises a plurality of approximately parallel curvilinear cutting sections, and wherein the plurality of boundary region groups comprises a plurality of overlapping non-cutting sections;

for each of the plurality of trochoidal region groups in the raw toolpath, joining, by the toolpath computation device, an end point of a first curvilinear cutting section with a start point of a second curvilinear cutting section through a link move to obtain a trochoidal toolpath; and computing, by the toolpath computation device, a complete toolpath from the raw toolpath based on the trochoidal toolpath and the plurality of boundary region groups.

2. The method of claim 1, wherein determining the start point of the toolpath comprises:

computing a Euclidean distance transform for the pocket through a grassfire technique;

obtaining a discrete medial axis corresponding to the pocket shape by thresholding of a maximum value in the Euclidean distance transform; and selecting one or more points from the discrete medial axis as potential start points for the toolpath.

3. The method of claim 2, further comprising:

creating, at each start point of the toolpath, a plunge hole, wherein the diameter of each of the plunge holes is larger than a diameter of the machining tool;

computing a raw toolpath based on each of the set of start points and plunge holes to obtain a set of raw toolpaths, wherein each of the set of plunge holes corresponds to a starting point for each of the set of raw toolpaths; and selecting an optimal raw toolpath from the set of raw toolpaths based on a simulation of each of the set of raw toolpaths.

4. The method of claim 1, wherein the engagement value for a toolpath segment is determined based on identifying a change in number of pocket pixels when the machining tool is rendered at, at least one of:

the start point of the toolpath segment; and at each of the start point and the end point of the toolpath segment.

5. The method of claim 1, wherein:

for each of the set of cutting sections, the engagement value of the machining tool with the raw material body is greater than a predefined threshold number, and for each of the set of non-cutting sections, the engagement value of the machining tool with the raw material body is less than a predefined threshold number.

6. The method of claim 1, wherein computing the complete toolpath comprises, at least one of:

while traversing each of the plurality of toolpath segments on the trochoidal toolpath, adding the trochoid if the toolpath segment belongs to the trochoid and the trochoid has not already been added to the toolpath; and upon encountering a non-cutting segment that belongs to a boundary region group, adding smallest non-cutting section in the boundary group, wherein the non-cutting section is previously not included the toolpath; and identifying and patching gaps in the toolpath using additional segments.

7. The method of claim 6, further comprising:

for identifying and patching gaps in the toolpath, determining whether an end point of the toolpath segment is concurrent with a start point of a next toolpath segment;

creating a rapid link move between the start point and the end point when the end point of the toolpath segment is not concurrent with the start point of the next toolpath segment; and upon detecting a gouge on the rapid link move, creating an alternate non-gouging rapid link move by modifying the rapid link move to follow the boundary of the pocket in the section where the gouge is detected.

8. The method of claim 1, further comprising:

identifying sharp corners in the complete tool path; and smoothening the sharp corners by repeatedly convolving a smoothening operator over the complete toolpath till a predefined level of smoothness is obtained.

9. A system for computing a toolpath for machining a pocket on a raw material body, the system comprising:

a processor; and a memory communicatively coupled to the processor, wherein the memory stores processor-executable instructions, which, on execution, cause the processor to:

render a 2-dimensional (2D) pixel representation corresponding to a cross-section of each of a machining tool and the pocket;

determine a start point for the toolpath from the 2D pixel representation, wherein the toolpath comprises a plurality of segments;

for computing each of subsequent segments in the toolpath, determine tool engagement values corresponding to a plurality of potential moves of the machining tool with the raw material body based on the 2D pixel representation; and one of, selecting, from the plurality of potential moves, a move with a corresponding tool engagement value closest to a required tool engagement value; or selecting, as a next move, a move that follows a boundary of the pocket, when the determined tool engagement value is not positive;

identify a set of cutting sections and a set of non-cutting sections based on the engagement value at each toolpath segment;

identify a plurality of trochoidal region groups from the set of cutting sections and a plurality of boundary region groups from the set of non-cutting sections in the raw toolpath, wherein the plurality of trochoidal region groups comprises a plurality of approximately parallel curvilinear cutting sections, and wherein the plurality of boundary region groups comprises a plurality of overlapping non-cutting sections;

for each of the plurality of trochoidal region groups in the raw toolpath, join an end point of a first curvilinear cutting section with a start point of a second curvilinear cutting section through a link move to obtain a trochoidal toolpath; and compute a complete toolpath from the raw toolpath based on the trochoidal toolpath and the plurality of boundary region groups.

10. The system of claim 9, wherein the processor-executable instructions further cause the processor to determine the start point of the toolpath by:

computing a Euclidean distance transform for the pocket through a grassfire technique;

thresholding a maximum value in the Euclidean distance transform to obtain a discrete medial axis corresponding to the pocket shape; and selecting one or more points from the discrete medial axis as potential start points for the toolpath.

11. The system of claim 10, wherein the processor-executable instructions further cause the processor to:

create, at each start point of the toolpath, a plunge hole, wherein the diameter of each of the plunge holes is larger than a diameter of the machining tool;

compute a raw toolpath based on each of the set of start points and plunge holes to obtain a set of raw toolpaths, wherein each of the set of plunge holes corresponds to a starting point for each of the set of raw toolpaths; and select an optimal raw toolpath from the set of raw toolpaths based on a simulation of each of the set of raw toolpaths.

12. The system of claim 9, wherein the engagement value for a toolpath segment is determined based on identifying a change in number of pocket pixels when the machining tool is rendered at, at least one of:

the start point of the toolpath segment; and at each of the start point and the end point of the toolpath segment.

13. The system of claim 9, wherein:

for each of the set of cutting sections, the engagement value of the machining tool with the raw material body is greater than a predefined threshold number, and for each of the set of non-cutting sections, the engagement value of the machining tool with the raw material body is less than a predefined threshold number.

14. The system of claim 9, wherein the processor-executable instructions further cause the processor to compute the complete toolpath by, at least one of:

while traversing each of the plurality of toolpath segments on the trochoidal toolpath, adding the trochoid if the toolpath segment belongs to the trochoid and the trochoid has not already been added to the toolpath;

upon encountering a non-cutting segment that belongs to a boundary region group, adding smallest non-cutting section in the boundary group, wherein the non-cutting section is previously not included the toolpath; and identifying and patching gaps in the toolpath using additional segments.

15. The system of claim 14, wherein the processor-executable instructions further cause the processor to:

for identifying and patching gaps in the toolpath, determine whether an end point of the toolpath segment is concurrent with a start point of a next toolpath segment;

create a rapid link move between the start point and the end point when the end point of the toolpath segment is not concurrent with the start point of the next toolpath segment; and upon detecting a gouge on the rapid link move, create an alternate non-gouging rapid link move by modifying the rapid link move to follow the boundary of the pocket in the section where the gouge is detected.

16. The system of claim 9, wherein the processor-executable instructions further cause the processor to:

identify sharp corners in the complete tool path; and smoothen the sharp corners by repeatedly convolving a smoothening operator over the complete toolpath till a predefined level of smoothness is obtained.

17. A non-transitory computer-readable medium storing computer-executable instructions for computing a toolpath for machining a pocket on a raw material body, the computer-executable instructions configured for:

rendering a 2-dimensional (2D) pixel representation corresponding to a cross-section of each of a machining tool and the pocket;

determining a start point for the toolpath from the 2D pixel representation, wherein the toolpath comprises a plurality of segments;

for computing each of subsequent segments in the toolpath, determining tool engagement values corresponding to a plurality of potential moves of the machining tool with the raw material body based on the 2D pixel representation; and one of, selecting, from the plurality of potential moves, a move with a corresponding tool engagement value closest to a required tool engagement value; or selecting, as a next move, a move that follows a boundary of the pocket, when the determined tool engagement value is not positive;

identifying a set of cutting sections and a set of non-cutting sections based on the engagement value at each toolpath segment;

identifying a plurality of trochoidal region groups from the set of cutting sections and a plurality of boundary region groups from the set of non-cutting sections in the raw toolpath, wherein the plurality of trochoidal region groups comprises a plurality of approximately parallel curvilinear cutting sections, and wherein the plurality of boundary region groups comprises a plurality of overlapping non-cutting sections;

for each of the plurality of trochoidal region groups in the raw toolpath, joining an end point of a first curvilinear cutting section with a start point of a second curvilinear cutting section through a link move to obtain a trochoidal toolpath; and computing a complete toolpath from the raw toolpath based on the trochoidal toolpath and the plurality of boundary region groups.

18. The non-transitory computer-readable medium of the claim 17, wherein the computer-executable instructions further configured for:

computing a Euclidean distance transform for the pocket through a grassfire technique;

thresholding a maximum value in the Euclidean distance transform to obtain a discrete medial axis corresponding to the pocket shape; and selecting one or more points from the discrete medial axis as potential start points for the toolpath.

19. The non-transitory computer-readable medium of the claim 18, wherein the computer-executable instructions further configured for:

creating, at each start point of the toolpath, a plunge hole, wherein the diameter of each of the plunge holes is larger than a diameter of the machining tool;

computing a raw toolpath based on each of the set of start points and plunge holes to obtain a set of raw toolpaths, wherein each of the set of plunge holes corresponds to a starting point for each of the set of raw toolpaths; and selecting an optimal raw toolpath from the set of raw toolpaths based on a simulation of each of the set of raw toolpaths.

20. The non-transitory computer-readable medium of the claim 17, wherein the engagement value for a toolpath segment is determined based on identifying a change in number of pocket pixels when the machining tool is rendered at, at least one of:

the start point of the toolpath segment; and at each of the start point and the end point of the toolpath segment.

* * * * *